UNITED STATES PATENT OFFICE.

GEORGE W. HOOVEN, OF ENGLEWOOD, NEW JERSEY.

CATTLE FOOD AND METHOD OF MAKING THE SAME.

No. 836,765.  Specification of Letters Patent.  Patented Nov. 27, 1906.

Application filed December 21, 1904. Serial No. 237,836.

*To all whom it may concern:*

Be it known that I, GEORGE W. HOOVEN, a citizen of the United States, and a resident of Englewood, in the county of Bergen, State of New Jersey, have invented certain new and useful Improvements in Cattle Food and Methods of Making the Same, of which the following is a specification.

This invention relates to food products especially suitable for cattle food and which utilize marc or winery refuse as ingredients.

The marc or winery refuse, comprising the skins, pulp, and seeds of the grapes, is preferably thoroughly dried in any suitable drying apparatus, so as to thoroughly remove the moisture and prevent decomposition. Then, if desired, the seeds can be removed after slightly breaking up the material, which assists this operation, and then the seeds may be ground to about the fineness of coarse meal, preferably after having been subjected to the action of water or other solvent to remove the tannin and other undesirable and astringent ingredients from the seeds, these elements being found in greater proportions in the outer parts of the grape-seeds. The rest of the dried marc is also preferably reduced by any suitable disintegrator to about the consistency of coarse meal, or, if desired, the entire marc, including all its elements, may after drying be simultaneously disintegrated.

The ground material is preferably treated with suitable carbohydrates or saccharine matter to bring up the proportion of this food ingredient in the finished product, and this can be conveniently done by mixing with the ground material a suitable proportion of crude molasses, such as is usually sold as a waste product of sugar-refineries. This refinery refuse can be conveniently incorporated in the ground material in any desired quantities up to about thirty per cent. by adding the molasses or similar carbohydrate material and thoroughly incorporating the ingredients in a suitable mixer. The dried material under these conditions absorbs the moisture, and the resulting food product is a comparatively smooth ground meal which is not inconvenient for most purposes because of an excessive proportion of moisture. When the dried marc material is incorporated with twenty-five per cent. of molasses, a very desirable product is produced. If desired, however, the mixed material may be thoroughly dried, which decreases its weight and also facilitates transportation and increases its keeping qualities to some extent.

It is desirable for the reasons mentioned to separate the seeds from the other elements of the marc before disintegrating this dried material. Subsequently the disintegrated seeds or the other disintegrated material may be used separately as food products or either one of them may be used after the incorporation of a suitable proportion of carbohydrates, such as sugar by-products, or the ground seeds and the other ground marc material may be mixed in any desired proportion and the proper amount of molasses or equivalent material incorporated therewith.

Those familiar with this art may make many changes in the proportions, ingredients, and the exact steps of making this food product. I do not, therefore, desire to be limited to exactly what has been disclosed in this application; but

What I claim as new, and what I desire to secure by Letters Patent, is set forth in the appended claims:

1. The process of making a food product which consists in drying marc material and separating the seeds from the other elements thereof, in removing portions of the astringent ingredients from said seeds, in separately disintegrating said seeds and the skins and pulp and mixing the ground seed and ground skins and pulp together with a carbohydrate.

2. The food product consisting of an intimate mixture of dried ground grape-seeds free from astringent qualities, skins and pulp, combined with substantially twenty to thirty per cent. of a saccharine carbohydrate.

3. The food product consisting of an intimate mixture of dried ground grape-seeds free from astringent qualities, skins and pulp, combined with substantially twenty per cent. to thirty per cent. of molasses.

GEORGE W. HOOVEN.

Witnesses:
HARRY C. DUNCAN,
JESSIE B. KAY.